(12) United States Patent
Heggebø et al.

(10) Patent No.: US 12,358,721 B2
(45) Date of Patent: *Jul. 15, 2025

(54) AUTOMATED STORAGE AND RETRIEVAL SYSTEM COMPRISING CONTAINER IDENTIFICATION MEANS AND METHODS OF IDENTIFYING A CONTAINER OR A VEHICLE

(71) Applicant: Autostore Technology AS, Nedre Vats (NO)

(72) Inventors: Jørgen Djuve Heggebø, Ølen (NO); Ivar Fjeldheim, Haugesund (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,950

(22) Filed: Apr. 30, 2024

(65) Prior Publication Data
US 2024/0278988 A1 Aug. 22, 2024

Related U.S. Application Data

(63) Continuation of application No. 16/981,109, filed as application No. PCT/EP2019/056337 on Mar. 13, 2019, now Pat. No. 12,006,145.

(30) Foreign Application Priority Data

Mar. 23, 2018 (NO) .................... 20180409

(51) Int. Cl.
*B65G 1/04* (2006.01)
*B65G 1/137* (2006.01)
(Continued)

(52) U.S. Cl.
CPC ......... *B65G 1/0464* (2013.01); *B65G 1/0478* (2013.01); *B65G 1/1371* (2013.01);
(Continued)

(58) Field of Classification Search
CPC .. B65G 1/0464; B65G 1/1371; B65G 1/1375; B65G 2203/046; B65G 2209/04;
(Continued)

(56) References Cited

U.S. PATENT DOCUMENTS 3,927,773 A 12/1975 Bright
7,538,681 B1 * 5/2009 Sharma .............. G06K 7/10316
235/375
(Continued)

FOREIGN PATENT DOCUMENTS

EP 1818286 A1 8/2007
GB 2514930 A 12/2014
(Continued)

OTHER PUBLICATIONS

Tove Kathrine Rognan, Office Action in Norwegian patent application No. 20180409, mailed May 29, 2024, 11 pages, Norwegian Industrial Property Office, Oslo, NO.
(Continued)

*Primary Examiner* — Thomas Randazzo
(74) *Attorney, Agent, or Firm* — Baker Botts L.L.P.

(57) ABSTRACT

A vehicle, which is for use in an automated storage and retrieval system, includes a transport mechanism and a lifting device. The transport mechanism is for transporting the vehicle along a first guiding system in a first direction and a second guiding system in a second direction. The second direction is orthogonal to the first direction. The lifting device is for lifting storage containers from storage columns arranged below the vehicle. The lifting device includes a lifting frame connectable to a storage container.
(Continued)

The vehicle further includes at least one reader for reading at least one label of a storage container such as to identify the storage container. The at least one reader is arranged on the lifting frame of the vehicle.

20 Claims, 10 Drawing Sheets

(51) Int. Cl.
   *B66C 13/48* (2006.01)
   *B66C 17/06* (2006.01)
   *G06K 7/10* (2006.01)

(52) U.S. Cl.
   CPC ............ *B65G 1/1375* (2013.01); *B66C 13/48* (2013.01); *B66C 17/06* (2013.01); *G06K 7/10316* (2013.01); *B65G 2203/046* (2013.01); *B65G 2209/04* (2013.01)

(58) Field of Classification Search
   CPC .. B65G 1/1378; B65G 1/137; B65G 2209/06; B66C 13/48; B66C 17/06; G06K 7/10316
   See application file for complete search history.

(56) References Cited

U.S. PATENT DOCUMENTS

| | | | |
|---|---|---|---|
| 9,487,356 | B1 | 11/2016 | Aggarwal |
| 10,471,597 | B1* | 11/2019 | Murphy ................. B25J 9/1674 |
| 12,006,145 | B2* | 6/2024 | Heggebø ............. B65G 1/1375 |
| 2004/0037679 | A1 | 2/2004 | Sato et al. |
| 2005/0075989 | A1* | 4/2005 | Biasi ...................... G06Q 10/08 |
| | | | 705/410 |
| 2007/0135961 | A1* | 6/2007 | Ishida .................. B65G 1/1371 |
| | | | 700/213 |
| 2010/0030667 | A1* | 2/2010 | Chudy .................. G06Q 10/08 |
| | | | 705/28 |
| 2011/0106295 | A1 | 5/2011 | Miranda et al. |
| 2012/0092643 | A1* | 4/2012 | Rintanen ................ B66C 13/46 |
| | | | 356/4.01 |
| 2013/0261792 | A1* | 10/2013 | Gupta .................... G05B 15/02 |
| | | | 700/232 |
| 2015/0098775 | A1 | 4/2015 | Razumov |
| 2015/0127143 | A1* | 5/2015 | Lindbo .................. B65G 1/137 |
| | | | 700/218 |
| 2015/0239685 | A1* | 8/2015 | Han ...................... B65G 63/004 |
| | | | 700/215 |
| 2016/0239802 | A1* | 8/2016 | Burch, V ................ H04W 4/12 |
| 2023/0286745 | A1* | 9/2023 | Lindbo .................. A62C 2/247 |

FOREIGN PATENT DOCUMENTS

| | | |
|---|---|---|
| NO | 317366 B1 | 10/2004 |
| WO | 98/49075 A1 | 11/1998 |
| WO | 2013/167907 A1 | 11/2013 |
| WO | 2014/075937 A1 | 5/2014 |
| WO | 2014/090684 A1 | 6/2014 |
| WO | 2015/193278 A1 | 12/2015 |
| WO | 2016063197 A1 | 4/2016 |
| WO | 2016/194428 A1 | 12/2016 |
| WO | 2016/198467 A1 | 12/2016 |
| WO | 2017/081281 A1 | 5/2017 |
| WO | 2017150005 A1 | 9/2017 |

OTHER PUBLICATIONS

International Search Report issued in PCT/EP2019/056337 mailed on Jun. 21, 2019 (6 pages).
Written Opinion of the International Searching Authority issued in PCT/EP2019/056337 mailed on Jun. 21, 2019 (10 pages).
International Preliminary Report on Patentability from PCT/EP2019/056337 mailed on Feb. 4, 2020 (17 pages).

* cited by examiner

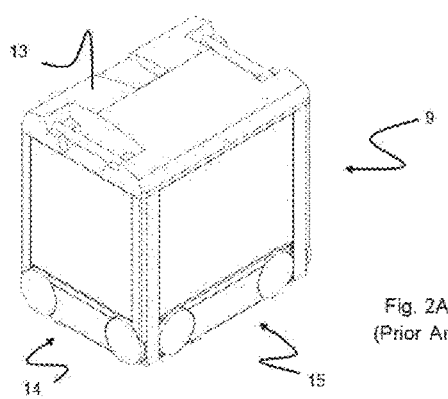
Fig. 2A
(Prior Art)
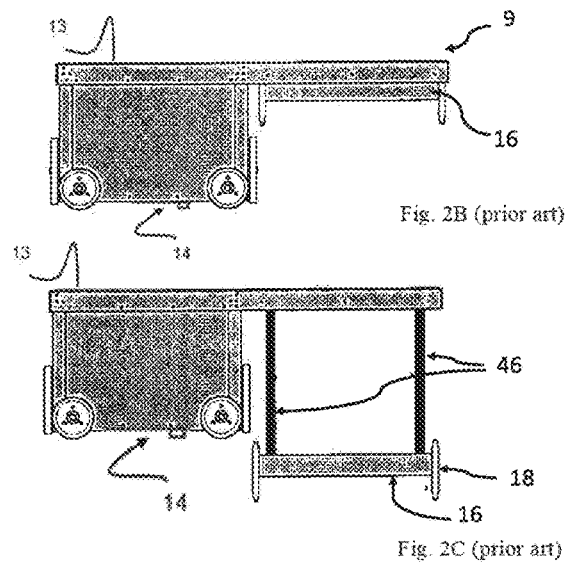
Fig. 2B (prior art)
Fig. 2C (prior art)

AUTOMATED STORAGE AND RETRIEVAL SYSTEM COMPRISING CONTAINER IDENTIFICATION MEANS AND METHODS OF IDENTIFYING A CONTAINER OR A VEHICLE

TECHNICAL FIELD

The present invention relates to an automated storage and retrieval system, a vehicle operable on an automated storage and retrieval system and methods of identifying storage containers, and method for verifying the position of a vehicle in an automated storage and retrieval system.

BACKGROUND

FIG. 1 discloses a framework structure 1 of a typical prior art automated storage and retrieval system and FIGS. 2A-2C disclose different container handling vehicles 9 of such a system.

The framework structure 1 comprises a plurality of upright members 2 and a plurality of horizontal members 3, which are supported by the upright members 2. The members 2, 3 may typically be made of metal, e.g. extruded aluminium profiles.

The framework structure 1 defines a storage grid 4 comprising storage columns 5 arranged in rows, in which storage columns 5 store storage containers 6, also known as bins, are stacked one on top of another to form stacks 7. Each storage container 6 may typically hold a plurality of product items (not shown), and the product items within a storage container 6 may be identical, or may be of different product types depending on the application. The framework structure 1 guards against horizontal movement of the stacks 7 of storage containers 6, and guides vertical movement of the containers 6, but does normally not otherwise support the storage containers 6 when stacked.

A rail system 8 is arranged in a grid pattern across the top of the storage columns 5, on which rail system 8 a plurality of container handling vehicles 9 are operated to raise storage containers 6 from and lower storage containers 6 into the storage columns 5, and also to transport the storage containers 6 above the storage columns 5. The rail system 8 comprises a first set of parallel rails 10 arranged to guide movement of the container handling vehicles 9 in a first direction X across the top of the frame structure 1, and a second set of parallel rails 11 arranged perpendicular to the first set of rails 10 to guide movement of the container handling vehicles 9 in a second direction Y, which is perpendicular to the first direction X. In this way, the rail system 8 defines grid columns 12 above which the container handling vehicles 9 can move laterally above the storage columns 5, i.e. in a plane which is parallel to the horizontal X-Y plane.

Each container handling vehicle 9 comprises a vehicle body 13 and first and second sets of wheels 14, 15 which enable the lateral movement of the container handling vehicle 9, i.e. the movement in the X and Y directions. In FIG. 2A two wheels in each of the sets 14, 15 are visible, while in FIGS. 2B and 2C only two wheels in one of the set of wheels 14 are visible. The first set of wheels 14 is arranged to engage with two adjacent rails of the first set 10 of rails, and the second set of wheels 15 is arranged to engage with two adjacent rails of the second set 11 of rails. Each set of wheels 14, 15 can be lifted and lowered, so that the first set of wheels 14 and/or the second set of wheels 15 can be engaged with the respective set of rails 10, 11 at any one time.

Each container handling vehicle 9 also comprises a lifting device 16 (see FIGS. 2B and 2C) for vertical transportation of storage containers 6, e.g. raising a storage container 6 from and lowering a storage container 6 into a storage column 5. The lifting device may be arranged inside the body 13 (as in FIG. 2A) or outside the body 13 (as disclosed in FIGS. 2B and 2C). The lifting device 16 may comprise a lifting frame 18 which is adapted to engage a storage container 6, which lifting frame 18 can be lowered from the vehicle body 13 so that the position of the lifting frame with respect to the vehicle body 13 can be adjusted in a third direction Z, which is orthogonal the first direction X and the second direction Y. Lifting bands 46 may be used to lower the lifting frame 18, the lifting bands 46 may comprise powering and control cables for controlling the gripping device 16.

Conventionally, and also for the purpose of this application, Z=1 identifies the uppermost layer of the grid 4, i.e. the layer immediately below the rail system 8, Z=2 the second layer below the rail system 8, Z=3 the third layer etc. In the embodiment disclosed in FIG. 1, Z=8 identifies the lowermost, bottom layer of the grid 4. Consequently, as an example and using the Cartesian coordinate system X, Y, Z indicated in FIG. 1, the storage container identified as 7' in FIG. 1 can be said to occupy grid location or cell X=10, Y=2, Z=3. The container handling vehicles 9 can be said to travel in layer Z=0 and each grid column can be identified by its X and Y coordinates.

Each container handling vehicle 9 comprises a storage compartment or space for receiving and stowing a storage container 6 when transporting the storage container 6 across the grid 4. The storage space may comprise a cavity arranged centrally within the vehicle body 13 (FIG. 2A), e.g. as is described in WO2014/090684A1, the contents of which are incorporated herein by reference. Alternatively, the storage compartment or space can be arranged on the side of the body as disclosed in FIGS. 2B and 2C, i.e. the container handling vehicles may have a cantilever construction, as is described in NO317366, the contents of which are also incorporated herein by reference.

The container handling vehicles 9 may have a footprint 25 (see FIG. 4), i.e. an extent in the X and Y directions, which is generally equal to the lateral (horizontal) extent of a grid column 12, i.e. the extent of a grid column 12 in the X and Y directions, e.g. as is described in WO2015/193278A1, the contents of which are incorporated herein by reference. Alternatively, the container handling vehicles 9 may have a footprint which is larger than the lateral extent of a grid column 12, e.g. as is disclosed in WO2014/090684A1.

The rail system 8 may be a single rail system, as is shown in FIG. 3. Alternatively, the rail system 8 may be a double rail system, as is shown in FIG. 4, thus allowing a container handling vehicle 9 having a footprint 25 generally corresponding to the lateral extent of a grid column 12 to travel along a row of grid columns even if another container handling vehicle 9 is positioned above a grid column neighbouring that row.

In a storage grid, a majority of the grid columns 12 are storage columns 5, i.e. grid columns where storage containers are stored in stacks. However, a grid normally has at least one grid column which is used not for storing storage containers, but which comprises a location where the container handling vehicles can drop off and/or pick up storage containers so that they can be transported to an access station where the storage containers can be accessed from outside of the grid or transferred out of or into the grid. Within the art, such a location is normally referred to as a "port" and the grid column in which the port is located may be referred to as a port column.

The grid 4 in FIG. 1 comprises two port columns 19 and 20. The first port column 19 may for example be a dedicated drop-off port column where the container handling vehicles 9 can drop off storage containers to be transported to an access or a transfer station (not shown), and the second port 20 column may be a dedicated pick-up port column where the container handling vehicles 9 can pick up storage containers that have been transported to the grid 4 from an access or a transfer station.

The access station may typically be a picking or a stocking station where product items are removed from or positioned in the storage containers. In a picking or a stocking station, the storage containers are normally never removed from the automated storage and retrieval system, but are returned back into the grid once accessed. A port can also be used for transferring storage containers out of or into the grid, e.g. for transferring storage containers to another storage facility (e.g. to another grid or to another automated storage and retrieval system), to a transport vehicle (e.g. a train or a lorry), or to a production facility.

A conveyor system comprising conveyors is normally employed to transport the storage containers between the ports and the access station.

If the port and the access station are located at different levels, the conveyor system may comprise a lift device for transporting the storage containers vertically between the port and the access station.

The conveyor system may be arranged to transfer storage containers between different grids, e.g. as is described in WO2014/075937A1, the contents of which are incorporated herein by reference.

WO2016/198467A1, the contents of which are incorporated herein by reference, disclose an example of a prior art access system having conveyor belts (FIGS. 5a and 5b in WO2016/198467A1) and a frame mounted track (FIGS. 6a and 6b in WO2016/198467A1) for transporting storage containers between ports and work stations where operators can access the storage containers.

When a storage container 6 stored in the grid 4 disclosed in FIG. 1 is to be accessed, one of the container handling vehicles 9 is instructed to retrieve the target storage container from its position in the grid 4 and transport it to the drop-off port 19. This operation involves moving the container handling vehicle 9 to a grid location above the storage column in which the target storage container is positioned, retrieving the storage container from the storage column using the container handling vehicle's lifting device (not shown), and transporting the storage container to the drop-off port 19. If the target storage container 6 is located deep within a stack 7, i.e. with one or a plurality of other storage containers positioned above the target storage container, the operation also involves temporarily moving the above-positioned storage containers prior to lifting the target storage container from the storage column. This step, which is sometimes referred to as "digging" within the art, may be performed with the same container handling vehicle 9 that is subsequently used for transporting the target storage container to the drop-off port 19, or with one or a plurality of other cooperating container handling vehicles 9. Alternatively, or in addition, the automated storage and retrieval system may have container handling vehicles 9 specifically dedicated to the task of temporarily removing storage containers 6 from a storage column. Once the target storage container has been removed from the storage column, the temporarily removed storage containers 6 can be repositioned into the original storage column. However, the removed storage containers 6 may alternatively be relocated to other storage columns.

When a storage container 6 is to be stored in the grid 4, one of the container handling vehicles 9 is instructed to pick up the storage container from the pick-up port 20 and transport it to a grid location above the storage column where it is to be stored. After any storage containers 6 positioned at or above the target position within the storage column stack have been removed, the container handling vehicle 9 positions the storage container 6 at the desired position. The removed storage containers may then be lowered back into the storage column, or relocated to other storage columns.

For monitoring and controlling the automated storage and retrieval system, e.g. monitoring and controlling the location of respective storage containers within the grid 4, the content of each storage container 6, and the movement of the container handling vehicles 9 so that a desired storage container can be delivered to the desired location at the desired time without the container handling vehicles 9 colliding with each other, the automated storage and retrieval system comprises a central control system, which typically is computerised and comprises a database for keeping track of the storage containers.

A problem with prior art automated storage and retrieval systems is that storage containers may in some cases be manually moved in the storage system, in which case the central control system may lose track of storage containers. Furthermore, the central control system may in some cases experience black-outs, where position data of the storage containers is partially or wholly lost. Additionally, the vehicles may in some cases lose track of their own position in the storage system.

Therefore, it is an objective of the present invention to provide an automated storage and retrieval system which keeps track of storage containers in the storage system.

SUMMARY

The invention is set forth in the independent claims and the dependent claims describe alternatives of the invention.

The invention relates to a storage and retrieval system comprising: a guiding assembly comprising a first guiding system arranged in a first horizontal plane and extending in a first direction X, and a second guiding system arranged in a second horizontal plane and extending in a second direction Y which is orthogonal to the first direction, and a plurality of stacks of storage containers arranged in storage columns below the first and second guiding systems, wherein each storage column is located vertically below a grid opening of a plurality of adjacent grid cells, the grid cells forming a grid pattern in the horizontal plane, a vehicle comprising a lifting device for picking up storage containers from the storage columns to a position above the highest level of the storage columns, wherein the lifting device comprises a lifting frame connectable to a storage container, a transport mechanism for transporting the vehicle along the first and second guiding systems in the X and Y directions, wherein the vehicle comprises at least one reader, and wherein the system further comprises a storage container with at least one label, the at least one label comprises storage container information, and wherein the at least one reader is configured to read the at least one label such as to identify the storage container.

In an aspect, the guiding assembly comprises a rail system comprising a first set of parallel tracks arranged in the first horizontal plane and extending in the first direction X, and a second set of parallel tracks arranged in the second horizontal plane and extending in the second direction Y.

In one aspect, the first and second guiding systems can be rails or tracks and the transport mechanism can be wheels or belts.

In an aspect, the storage container information represents at least one of the following parameters: storage container height, storage container maximum allowable weight of content, storage container material and/or orientation of storage container.

In an aspect, the reader is in communication with a central control system, and the reader is able to transmit data representing the storage container to the central control system and to receive data representing a storage container from the central control system. Typically, the reader transmits the data via onboard control and communications systems of the vehicle, hereinafter referred to as the vehicle control system, which relays data to the central control system. The central control system may thus process the information from the label, thereby identifying and verifying the storage container and its position.

In an aspect, the at least one reader may be arranged on the lifting frame of the vehicle and the label may be arranged in a position of the storage container such that the reader us able to identify the label. This has the advantage that the storage container can be identified while in the storage column, i.e. the storage container does not have to be lifted to the vehicle. In order to easily and quickly identify the label (and thus the storage container), the at least one reader and the labels are preferably located relatively close to each other, i.e. at a given position relative each other, such that the reader can easily read the label(s). The reader may be powered and signally connected to the onboard control and communications systems via cables arranged in the lifting bands.

Alternatively, in another aspect, the at least one reader is arranged inside a storage space of the vehicle, i.e. in a central cavity, inside a body of the vehicle or a storage space arranged on the side of the body, e.g. for the container handling vehicles comprising a cantilever construction. In this aspect, the at least one reader is arranged at a position inside the cavity or body of the vehicle, e.g. in or on the side walls of the vehicle or in a top cover of the vehicle, preferably close to where the label(s) of the storage container is located when the storage container is lifted to the storage space of the vehicle.

In an aspect, the first horizontal plane and the second horizontal plane are the same horizontal plane. If a rail system is arranged on top of the storage columns forming a track system in the Z and Y directions for container handling vehicles, the first and second horizontal planes are in the same horizontal plane. Alternatively, if the vehicle is a traverse travelling vehicle, i.e. a straddling vehicle which is supported on two parallel beams, tracks or rails arranged in the outermost portion of the storage system, the transport mechanism in the X and Y directions may be in different horizontal planes or in the same horizontal plane, i.e. in the first and second horizontal plane or, the transport mechanism can be in the same horizontal plane, which same horizontal plane can be above the traverse travelling vehicle (the vehicle being supported underneath the horizontal plane in which the transport mechanism is located).

As an alternative to first and second guiding systems in the form of rails or tracks and the transport mechanism in the form of wheels or belts, the first and second guiding systems and transport mechanism can be a stator and rotor arrangement, in which the function will be known to the person skilled in the art and will not be described in greater detail herein. Alternatively, the first and second guiding systems and transport mechanism can be a rope/chain/belt/cog configuration, where a rope or chain is used in pulling the vehicle in the X and Y directions, either automatically or manually, e.g. by pulling by hand, using one or more winches/drawworks or similar. In the latter aspect, preferably one set of rope or chain extends in the X direction while another set of rope or chain extends in the Y direction. The skilled person will understand that any combinations of the different aspects of guiding systems and transport mechanisms can be employed.

In an aspect, the reader is a RFID reader and the label is a RFID label, however other readers and labels are possible, for example, and as described in greater detail below, electromagnetic field systems (RFID or NFC) or optical systems (barcode, QR code, camera reading written or engraved labels). In aspects of the invention, combinations of different kinds of readers and labels may be provided in case of failure or inadequacy of one, for example and RFID reader and label may be complemented by an optical system.

The reader and label are preferably based on a powered (i.e. active) reader and a passive label, however a powered reader and powered label may also be employed (e.g. Bluetooth and some types of Near Field Communication (NFC)). Examples of different communication means where a passive label and a powered reader are employed, which can be reader and label in the present invention, includes: electromagnetic field systems including: Radio Frequency IDentification (RFID), Near Field Communication (NFC) reader/writer, optical systems including: Barcode, Quick Response (QR) code, Camera reading machine-written or hand-written or engraved labels on or integrated in the surface of the storage container(s), possibly in connection with an image reader program such as an Optical character Recognition (OCR) adapted to recognize text and convert into signals to a control system.

The different electromagnet field systems have the following properties: Radio-frequency identification (RFID) uses electromagnetic fields to automatically identify and track labels attached to objects. The labels contain electronically stored information. Passive labels collect energy from a nearby RFID reader's interrogating radio waves. Active labels have a local power source (such as a battery) and may operate hundreds of meters from the RFID reader. Unlike a barcode, the label need not be within the line of sight of the reader, so it may be embedded in the tracked object. RFID is one method for Automatic Identification and Data Capture (AIDC). In aspects, metallic plates or other means to shield interfering electromagnetic waves from neighboring storage containers may be arranged around a label to avoid disturbances from these.

Near Field Communication (NFC) reader/writer enables NFC-enabled devices to read information stored on inexpensive NFC labels embedded in labels or smart posters. NFC standards cover communications protocols and data exchange formats and are based on existing radio-frequency identification (RFID) standards including ISO/IEC 14443 and FeliCa. The standards include ISO/IEC 18092 and those defined by the NFC Forum. NFC is rooted in radio-frequency identification technology (known as RFID) which allows compatible hardware to both supply power to and communicate with an otherwise unpowered and passive electronic label using radio waves.

The different optical systems have the following properties: A barcode is an optical, machine-readable, representation of data; the data usually describes something about the object that carries the barcode. Originally barcodes systematically represented data by varying the widths and spacings of parallel lines, and may be referred to as linear or one-dimensional (1D). Later two-dimensional (2D) codes were developed, using rectangles, dots, hexagons and other geometric patterns in two dimensions, usually called barcodes although they do not use bars as such. Barcodes were initially scanned by special optical scanners called barcode readers. Later application software became available for devices that could read images, such as smartphones with cameras. QR code (abbreviated from Quick Response Code) is the trademark for a type of matrix barcode (or two-dimensional barcode) first designed for the automotive industry in Japan. A barcode is a machine-readable optical label that contains information about the item to which it is attached. A QR code uses four standardized encoding modes (numeric, alphanumeric, byte/binary, and kanji) to efficiently store data; extensions may also be used. Camera reading machine-written, hand-written, images and drawings or engraved labels on the storage container(s), possibly in connection with an image reader program such as an Optical Character Recognition (OCR) adapted to recognize text and convert into signals to a control system Optical character recognition (also optical character reader, OCR) is the mechanical or electronic conversion of images of typed, handwritten or printed text into machine-encoded text, whether from a scanned document, a photo of a document, a scene-photo (for example the text on signs and billboards in a landscape photo) or from subtitle text superimposed on an image (for example from a television broadcast). It is widely used as a form of information entry from printed paper data records, whether passport documents, invoices, bank statements, computerized receipts, business cards, mail, printouts of static-data, or any suitable documentation. It is a common method of digitizing printed texts so that they can be electronically edited, searched, stored more compactly, displayed on-line, and used in machine processes such as cognitive computing, machine translation, (extracted) text-to-speech, key data and text mining.

Thus, the term 'label' shall be understood as any physical label attached onto the surface of the storage container or any label molded or cast into the material forming the walls of the storage container, or any handwritten or machine-written or engraved optically recognizable typography on the surface of the storage container.

According to an aspect, each storage container comprises at least two labels.

In an aspect, each storage container comprises one label, and wherein the one label is arranged at the same position in each of the storage containers. In addition, the different storage containers can be positioned relative to each other in a way such that the labels in the different storage containers are substantially directly vertically and horizontally (i.e. at the same level in horizontal neighboring storage containers) relative to the labels of other storage containers. Such arrangement will reduce the risk of noise from neighbouring labels in the case of e.g. radio-frequency based readers/labels.

The invention further relates to a vehicle operable on an automated storage and retrieval system, the vehicle comprises: a transport mechanism for transporting the vehicle along a first guiding system in a X direction and second guiding system in a Y direction, which Y direction is orthogonal to the X direction, a lifting device for picking up storage containers from storage columns arranged below the vehicle to a position above the highest level of the storage columns, wherein the lifting device comprises a lifting frame connectable to a storage container, wherein the vehicle further comprises at least one reader for reading at least one label of a storage container. Thus, the reader is configured to read the label such as to identify the storage container.

According to an aspect of the vehicle, the reader can be arranged on the lifting frame of the vehicle.

According to an aspect of the vehicle, the reader can be arranged inside a storage space, i.e. inside a cavity, inside a body of the vehicle or a storage space arranged on the side of the body, such as on or in a top cover or sidewalls of the vehicle.

In an aspect, the at least one reader is arranged at a position where it can read the at least one label in or on the storage container.

The invention further relates to a method of identifying at least one storage container in an automated storage and retrieval system, the automated storage and retrieval system comprising a guiding assembly comprising a first guiding system arranged in a first horizontal plane and extending in a first direction X, and a second guiding system arranged in a second horizontal plane and extending in a second direction Y which is orthogonal to the first direction X, and a plurality of stacks of storage containers arranged in storage columns below the first and second guiding systems, wherein each storage column is located vertically below a grid opening of a plurality of adjacent grid cells, the grid cells forming a grid pattern in the horizontal plane, a transport mechanism for transporting a vehicle along the first and second guiding systems in the X and Y directions, the vehicle comprising a lifting device for picking up storage containers from the storage columns to a position above the highest level of the storage columns using a lifting device comprising a lifting frame connectable to a storage container, the method comprising the steps of: controlling a vehicle to a position above a storage column in which storage column a storage container is assumed to be found, lowering the lifting frame to a position of a storage container, utilizing at least one reader positioned on the lifting frame to read storage container information comprised in at least one label of the storage container such as to identify the storage container.

The invention further relates to a method of identifying at least one storage container in an automated storage and retrieval system, the automated storage and retrieval system comprising a guiding assembly comprising a first guiding system arranged in a first horizontal plane and extending in a first direction X, and a second guiding system arranged in a second horizontal plane and extending in a second direction Y which is orthogonal to the first direction X, and a plurality of stacks of storage containers arranged in storage columns below the first and second guiding systems, wherein each storage column is located vertically below a grid opening of a plurality of adjacent grid cells, the grid cells forming a grid pattern in the horizontal plane, a transport mechanism for transporting a vehicle along the first and second guiding systems in the X and Y directions, the vehicle comprising a lifting device for picking up storage containers from the storage columns to a position above the highest level of the storage columns using a lifting device comprising a lifting frame connectable to a storage container, the method comprising the steps of: controlling a vehicle to a position above a storage column in which storage column a storage container is assumed to be found, lowering the lifting frame to a position of a storage container and gripping the storage container, lifting the storage container to a storage space of the vehicle, utilizing at least one reader positioned in the storage space to read storage container information comprised in at least one label of the storage container such as to identify the storage container.

If there is no storage container in the storage column, the vehicle may move to another storage column assumed to have a storage container.

In an aspect, the method further comprises the steps of: transmitting the storage container information and a position of said storage container to a central control system, identifying the storage container by processing the storage container information in the central control system, retrieving a record of positional data for storage containers stored in the central control system, comparing the position of the identified storage container with a recorded position of said storage container.

Thus, the central control system may verify that a storage container is in the recorded position. Typically, the information and position are transmitted to the central control system via the vehicle control system.

In aspects, where the step of comparing the position of the identified storage container with a recorded position of said storage container determines that the record of positional data for storage containers stored in the central control system is incorrect, the method may further comprise the steps of: moving the storage container to another storage column, updating the record of positional data for storage containers stored in the central control system, repeating the steps in the method until the position of all identified storage containers match with a recorded position of said storage containers in the record of positional data for storage containers stored in the central control system.

Should the central control system be unable to verify that the position of a storage container is in the recorded position, the central control system may thus commence a search and data recovery program. Typically, if one storage container is misplaced, at least one other storage container is also misplaced. A vehicle may thus dig out a plurality of storage containers to identify the misplaced containers, and may continue digging in new storage columns until all misplaced storage containers are found and the recorded of positional data matches is updated.

The invention further relates to a method for recovering at least a partial record of positional data for storage container stored in an automated storage and retrieval system, comprising a method according to any of the aforementioned aspects, and further comprising the steps of: transmitting the storage container information to a central control system via a control and communications system onboard the vehicle, identifying the storage container by processing the storage container information in the central control system, moving the storage container to another storage column, updating the record of positional data for storage containers stored in the central control system, repeating the steps in the method until the position of all storage containers are accounted for in the record of positional data for storage containers stored in the central control system.

Thus, if the central control system loses all positional data of the storage containers, the vehicle may commence a method to restore the data by digging through the storage columns and identifying each container, such as to feed the control system with storage container position data. In some cases, the central control system may have lost positional data only for a specific amount of time, and therefore only the top storage containers in the storage columns may have uncertain positional data. The vehicle may then dig in storage columns until a storage container is found where positional data is known, and this may be verified by a storage container being identified in a recorded position. Typically, the information and position are transmitted to the central control system via the vehicle control system.

The invention further relates to a method for verifying the position of a vehicle in an automated storage and retrieval system, comprising a method according to any of the aforementioned aspects, the method further comprises the steps of: transmitting the storage container information to a central control system, identifying the storage container by processing the storage container information in the central control system, retrieving a record of positional data for storage containers stored in the central control system, determining the position of the vehicle by comparing the identity of the storage container with a recorded position of said storage container, transmitting the determined position of the vehicle to the control and communications system onboard said vehicle.

Thus, a vehicle which may have lost or is believed to have lost its position can identify or verify its position on the grid by reading a container and comparing this with the stored positional information of the storage container in the central control system. Typically, the information and position are transmitted to the central control system via the vehicle control system.

The aforementioned methods may also utilize a plurality of container handling vehicles to simultaneously perform any of the steps in these methods. Thus, a speedier identification, verification and recovery of storage containers information and position may be achieved.

The invention can be used both for container handling vehicles with a central cavity and cantilever construction, or traverse travelling vehicles of a 'traverse crane construction', i.e. a vehicle which is supported by a structure supported on parallel outermost end tracks, rails or beams of the storage system straddling the storage system.

In the following description, numerous specific details are introduced by way of example only to provide a thorough understanding of embodiments of the claimed system and vehicle. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF DRAWINGS

Following drawings are appended to facilitate the understanding of the invention;

FIG. 2A is a perspective view of a first prior art container handling vehicle;

FIG. 2B is a side view of a second prior art container handling vehicle;

FIG. 2C is another side view of the second prior art container handling vehicle in FIG. 2B, showing a lifting device, i.e. elevator, for lifting and or lowering storage containers;

In the drawings, like reference numerals have been used to indicate like parts, elements or features unless otherwise explicitly stated or implicitly understood from the context.

DETAILED DESCRIPTION

Figure 1:
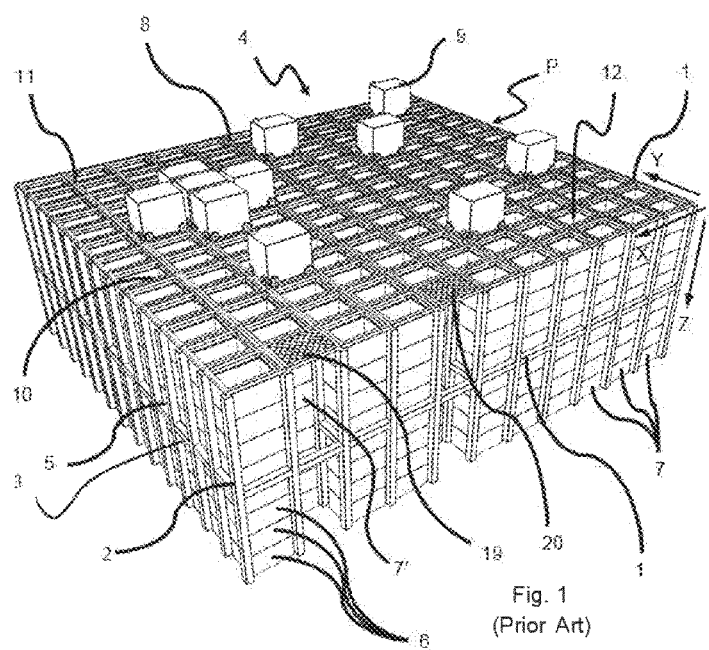
FIG. 1 is a perspective view of a grid with a rail system of a prior art automated storage and retrieval system.

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the vehicle and methods as well, and vice versa, i.e. any features described in relation to the vehicle or methods only are also valid for the system.

Figure 3:
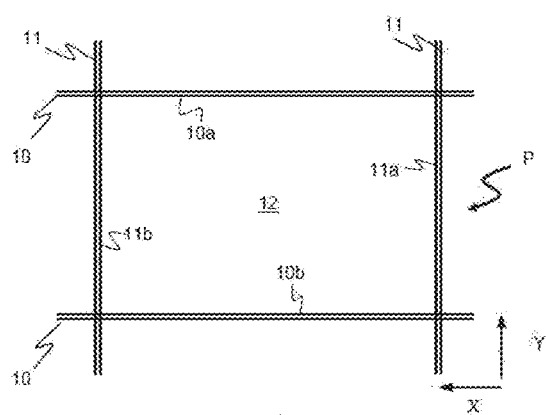
FIG. 3 is a top view of a prior art single rail grid.
Figure 4:
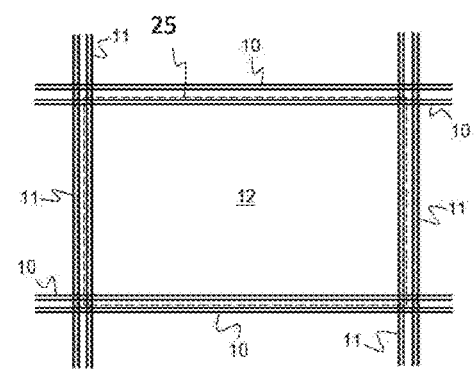
FIG. 4 is a top view of a prior art double rail grid.

FIG. 3 is a top view of a grid 4 with a rail system 8 of an automated storage and retrieval system. The grid 4 comprises a framework structure 1 comprising a plurality of upright members 2 (see FIG. 1) and a plurality of horizontal members 3 which are supported by the upright members. As is known in the art, the upright and horizontal members may typically be made of metal, e.g. extruded aluminium profiles. The upper surface of the grid 4 has a rail system 8. The rail system 8 comprises a first set of parallel tracks 10 arranged in a horizontal plane P and extending in a first direction X, and a second set of parallel tracks 11 arranged in the horizontal plane P and extending in a second direction Y which is orthogonal to the first direction X. The first and second sets of tracks 10, 11 form a grid pattern in the horizontal plane P comprising a plurality of adjacent grid cells, each comprising a grid opening 12 defined by a pair of neighboring tracks 10a, 10b of the first set of tracks 10 and a pair of neighboring tracks 11a, 11b of the second set of tracks 11. The example grid openings 12 in FIGS. 3 and 4 are part of the overall rail system 8 (see FIG. 1).

Figure 5:
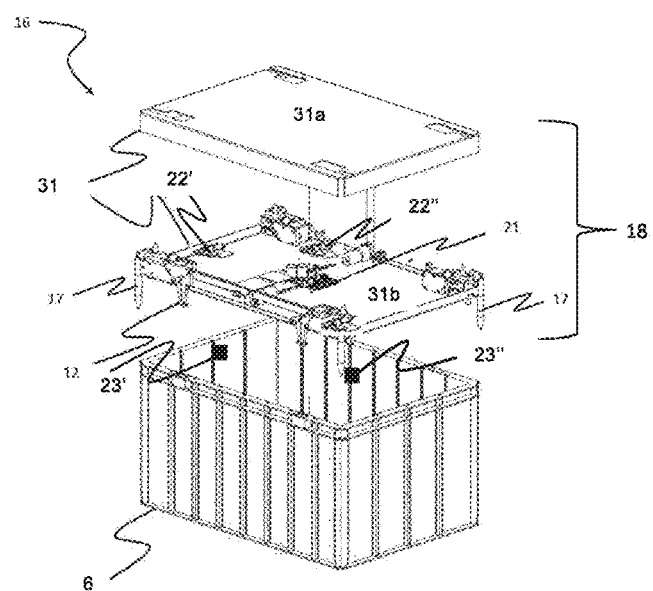
FIG. 5 shows details of a lifting frame forming part of a container handling vehicle, and a storage container, with a storage container identification system where the lifting frame comprises two readers and the storage container comprises two labels.

FIG. 5 shows an example of a lifting device 16 comprising a lifting frame 18, which lifting frame 18 comprises a lifting plate 31. The lifting plate 31 is formed of a top cover 31a and a base plate 31b. The lifting device 16, i.e. the base plate 31 comprises a plurality of gripping devices 12 for gripping/engaging with a storage container 6 and a plurality of guiding pins 17 for aligning the lifting device 16 with the storage container 6. The lifting plate 31 further comprises one or more cameras 21 installed on the lifting plate 31, preferably within the base cover 31b. The one or more cameras 12 are configured to record and register images of products arranged below the lifting device 16, i.e. into the framework structure 1 and underlying storage containers 6. The one or more cameras 21 can be electronically, either wirelessly or by wire connection, to a central control system (not shown) such that an operator may have real-time visual view of the grid and or content of one or more of the storage containers 6.

FIG. 5 further discloses a storage container identification system comprising two readers 22', 22" installed on the lifting plate 31 of the lifting frame 18 and two labels 23', 23" positioned inside the storage container 6. The labels 23' 23" comprise information relating to the storage container 6. The readers 22', 22" are configured to read the labels 23', 23" such as to identify the storage container 6. There may also be only one reader on each lifting plate 31. Preferably, the reader 22', 22" and the label 23', 23" are located relatively proximate each other, e.g. in positions close to each other as indicated by reader denoted 22' and label denoted 23' as well as reader denoted 22" and label denoted 23", respectively. This may be advantageous in order to avoid interference from neighboring storage container(s) with the result that a label in a neighboring storage container is read instead of the label of the correct storage container 6. Metallic plates or other means to shield interfering electromagnetic waves from neighboring storage container may also be arranged around a label.

For monitoring and controlling the automated storage and retrieval system 1 so that a desired storage container 6 can be delivered to the desired location at the desired time without the container handling vehicles 9 colliding with each other, the automated storage and retrieval system comprises a central control system (not shown), which typically is computerized and comprises a database for monitoring and controlling e.g. the location of the respective storage containers 6 within the storage grid 4, the content of each storage container 6 and the movement of the container handling vehicles 9.

Figure 6:
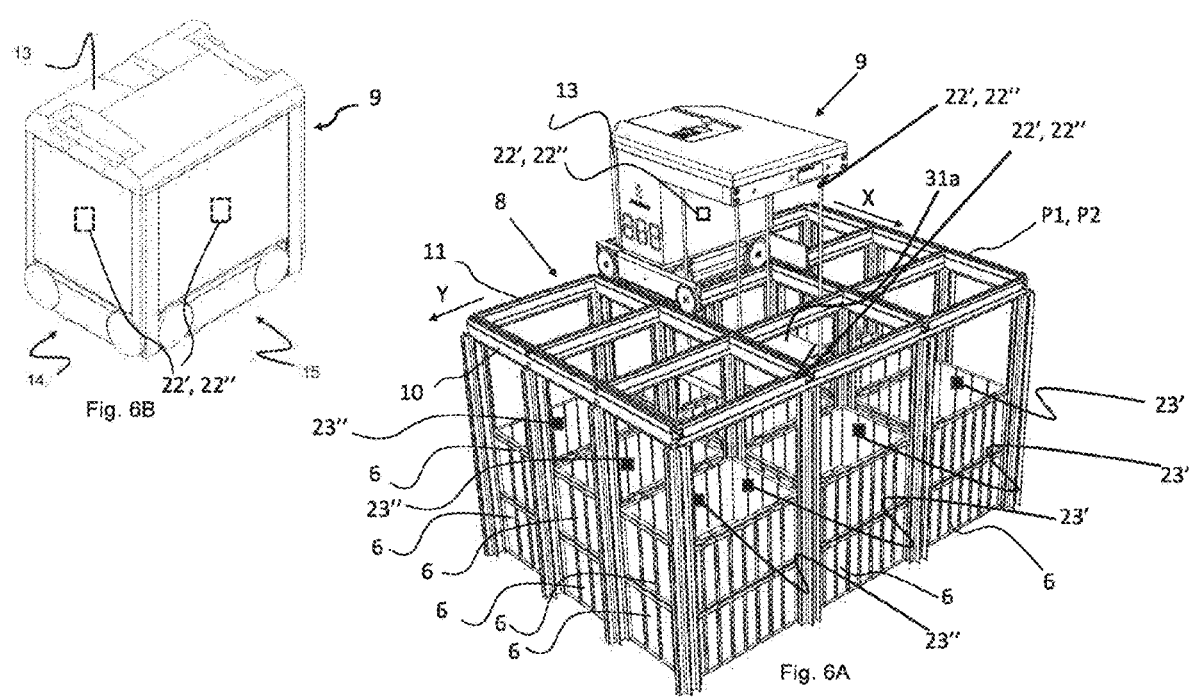
FIG. 6A is a perspective view of as container handling vehicle operating on a rail system, and a reader on the lifting frame or in the body of the container handling vehicle and a label in or on each of the storage containers.
FIG. 6B shows an example of a container handling vehicle with a central cavity or storage space, where readers are arranged on/in the sidewalls of the container handling vehicle.

FIG. 6A shows an example of a container handling vehicle 9 with a cantilever construction operating on a guiding assembly comprising a first guiding system in the form of tracks 10 arranged in a first horizontal plane (P1, P2) and extending in a first direction X, and a second guiding system in the form of tracks 11 arranged in a second horizontal plane (P1, P2) which is in the same horizontal plane as the first guiding system, and extending in a second direction Y. The second direction Y is orthogonal to the first direction X. The first and second set of tracks forming a rail system 8. It is further disclosed a reader 22', 22" on the lifting plate 31 of the container handling vehicle 9. Alternatively, also disclosed in FIG. 6A, in addition to or as a replacement of the reader 22', 22" on the lifting plate 31, the reader 22', 22" can be arranged in a storage space, e.g. in a cavity or in the body 13 of the container handling vehicle 9. Labels 23', 23" are disclosed in each of the storage containers 6 in the front row of the Figure, however it is clear that the remaining storage containers 6 in system are also provided with at least one label. In order to make sure that the reader(s) 22', 22" can read the label 23', 23" in all of the storage containers 6, the labels 23' are preferably arranged at the same position(s) in each container 6. The labels 23', 23" may also be arranged on the outside of the container(s) 6 such that a reader 22', 22" arranged in/on a sidewall facing the storage space of the vehicle 9 can easily identify the storage container 6.

The first and second horizontal planes P1, P2 are at the same elevation or level in the embodiment of FIG. 6A, i.e. at an elevation equal to an upper surface of the rail system 8.

FIG. 6B shows an example of a container handling vehicle 9 with a central cavity construction, where readers 22', 22" are arranged on/in the sidewalls of the container handling vehicle 9. Even though two readers 22', 22" are disclosed in the sidewalls, also less or more readers may be provided in one or all sidewalls of the vehicle 9, possibly in addition to one or more readers provided in the top cover of the vehicle 9.

Figure 7:
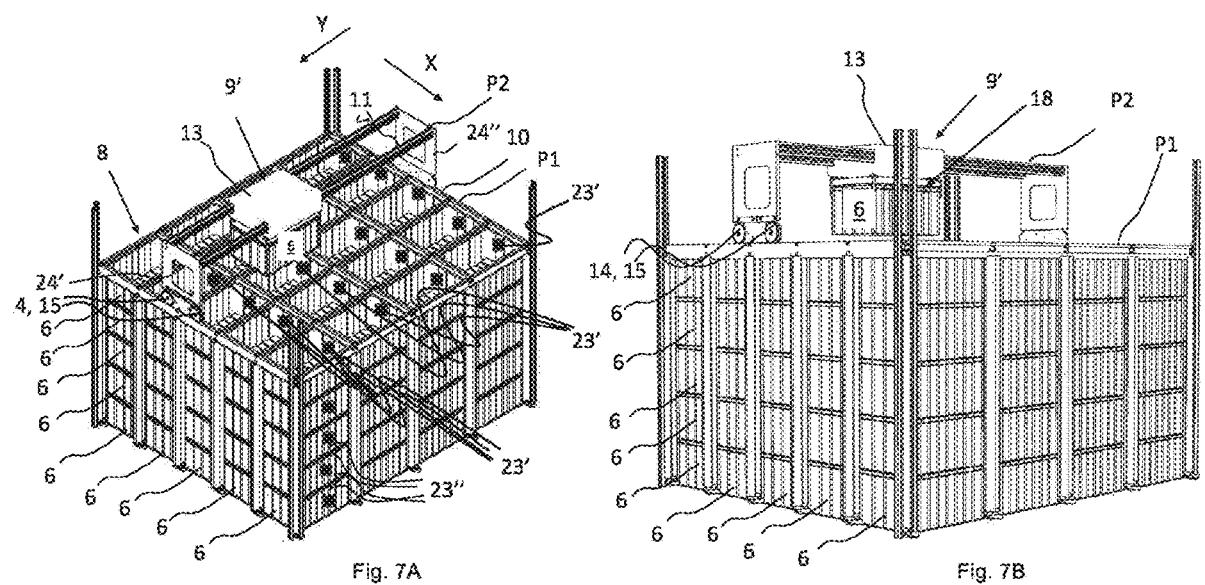
FIG. 7A is a perspective view of a traverse travelling vehicle operating on a rail system, with labels in each of the storage containers.
FIG. 7B is a side view of the traverse travelling vehicle and rail system in FIG. 7A.

FIG. 7A is a perspective view of a traverse travelling vehicle 9' operating on a rail system 8, whereas FIG. 7B is a side view of the traverse travelling vehicle 9' and rail system 8 in FIG. 7A. Similar to the embodiment of FIG. 5, although not shown in FIGS. 7A and 7B, the traverse travelling vehicle 9' comprises at least one reader 22', 22" arranged at the lifting frame 18 and or in a storage space inside a cavity or in the vehicle body 13, which at least one reader 22', 22" is adapted to read a label 23', 23" on the storage container 6. The labels 23', 23" may be inside of, or outside of, the storage containers 6. As is clear from FIG. 7A, a label 23' is arranged inside of or on an outer surface of each storage container 6, preferably at the same location such that the reader 22', 22" can easily identify the label 23', 23" and thus the storage container 6. A plurality of stacks of storage containers 6 are arranged in storage columns below the rail system 8.

According to the embodiment in FIGS. 7A and 7B, the traverse travelling vehicle 9' typically travels on a rail system 8 comprising a first set of parallel tracks 10 arranged in a first horizontal plane P1 and extending in a first direction X, and a second set of parallel tracks 11 arranged in a second horizontal plane P2 and extending in a second direction Y which is orthogonal to the first direction X. The second horizontal plane P2 is, in the embodiments of FIGS. 7A and 7B, arranged at a higher elevation or level than the first horizontal plane P1. The second set of parallel tracks 11 is disclosed as two parallel beams extending over the full length of the rail system in the Y direction. Alternatively, the two parallel beams may be replaced by a single beam. The vehicle 9', with lifting device 16 and lifting frame 18 is supported from the second set of parallel tracks 11 and operates at a horizontal level above the first set of parallel tracks 10. A first end portion of the beams is supported by a first support structure 24' connected to set of wheels 14, 15, and the second end portion of the beams is supported by a second support structure 24" connected to set of wheels 14, 15, for movement of the vehicle 9' in the X direction of the rail system 8. Alternatively, as seen in FIG. 8B, the set of wheels 14, 15, i.e. the transport mechanism, can be located in the second horizontal plane P2.

Figure 8:
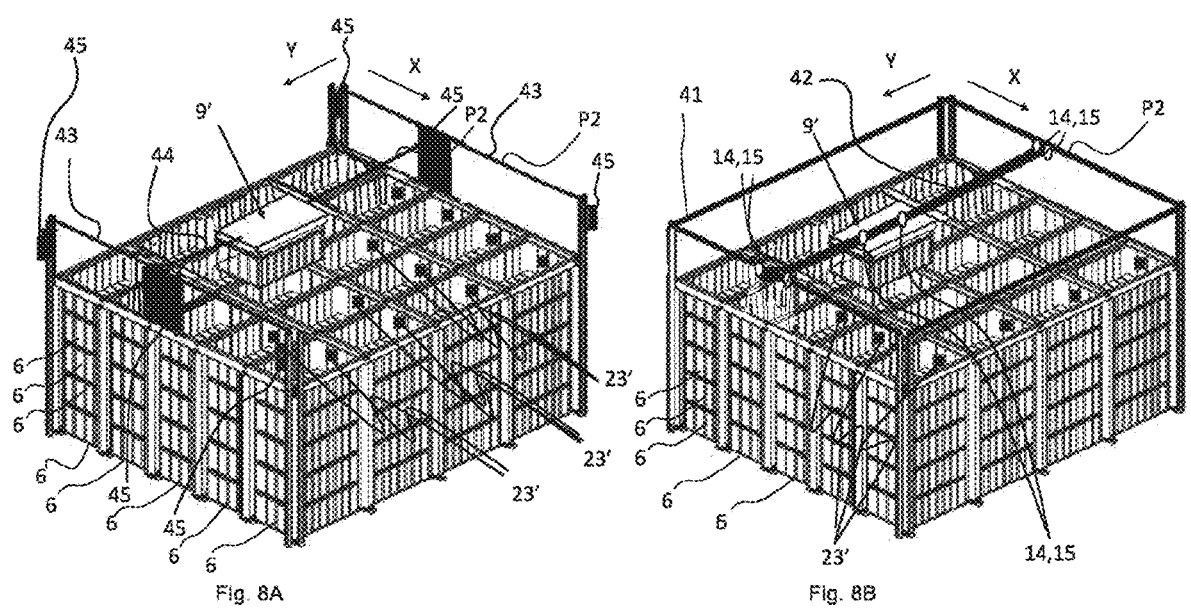
FIG. 8A shows an example of first and second guiding systems and transport mechanism in the form of a rope/chain/belt/cog configuration.
FIG. 8B shows an example of first and second guiding systems and transport mechanism in the form of wheels travelling along a support structure, where the transport mechanism is above or in an upper part of the vehicle.

FIG. 8A shows an example of first and second guiding systems and transport mechanism in the form of a rope or chain configuration. The first and second guiding systems and transport mechanism can be a rope or chain configuration, where a rope or chain 43, 44 is used in pulling the vehicle in the X and Y directions, either automatically or manually, e.g. by pulling by hand or using one or more winches 45. In the latter aspect, preferably at least one set of rope or chain 43 extends in the X direction while at least one other set of rope or chain 44 extends in the Y direction.

FIG. 8B shows an example of first and second guiding systems and transport mechanism 14, 15 travelling on a support structure 41 in the form of a beam arrangement. As seen in FIG. 8B, the set of wheels 14, 15, i.e. the transport mechanism, can be located in the second horizontal plane P2. In this latter aspect, both the transport mechanism moving the vehicle 9' in the X direction and the Y direction are arranged in the same horizontal plane (i.e. the second horizontal plane P2). In this aspect, there may be a support structure 41 extending along an outer periphery in the X and Y directions covering all of storage columns 5, and the vehicle 9' can be suspended from one or more beams 42. The transport mechanism 14, 15 moving the vehicle in the Y direction can be arranged above or in an upper part of the vehicle 9', and can be wheels or sheaves etc (as exemplified in FIG. 8B) travelling on or, being supported by, the one or more beams 42. Similarly, the transport mechanism 14 moving the vehicle 9' in the X direction may comprise wheels or sheaves travelling on the support structure.

The vehicle(s) 9, 9' typically communicate with the central control system from a control panel, typically arranged on top of the vehicle 9, via wireless communication means, e.g. via a WLAN operating under an IEEE 802.11 (Wi-Fi) standard and/or utilizing a mobile telecommunication technology such as 4G or higher.

Each vehicle 9, 9' comprises a battery which provides power to onboard equipment, including the lifting motor, the drive system for the first and second wheel arrangements 14,15 and onboard control and communications systems. In some aspects, such as the arrangements in FIGS. 8A and 8B, the vehicles 9,9' may be powered by a cable connection.

Figure 9:
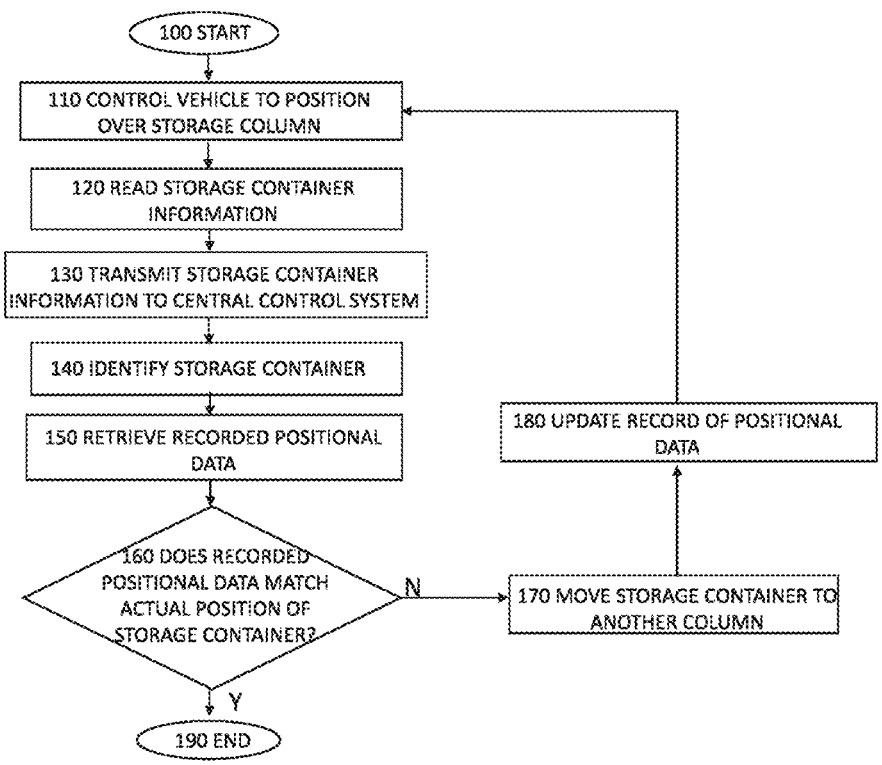
FIG. 9 is a schematic flow chart illustrating a method for verifying the position of a storage container.

FIG. 9 is a schematic flow chart illustrating a method for identifying at least one storage container 6 in an automated storage and retrieval system. During normal operation of the automated storage and retrieval system, the method in FIG. 9 is continuously being performed as the vehicles 9,9' move storage containers 6 around in the system.

The method starts at the initiating step 100. First, a vehicle 9,9' is moved to a position above a storage column 5 as indicated by step 110 where a storage container 6 is assumed to be found. In some aspects, the method may be started by the assumption that a storage container 6 has been misplaced, whereupon a vehicle 9,9' is dispatched to the storage column 5 where a suspected misplaced storage container 6 is located.

In aspects, step 120 comprises reading the storage container information by lowering the lifting frame 18 to a position of a storage container 6, and utilizing at least one reader 22', 22" positioned on the lifting frame 8 to read storage container information comprised in at least one label 23', 23" of the storage container 6 such as to identify the storage container 6. In further aspects, step 120 comprises lowering the lifting frame 18 to a position of a storage container 6 and gripping the storage container 6, lifting the storage container 6 to a storage space inside the vehicle 9, 9' and utilizing at least one reader 22', 22" positioned in the storage space to read storage container information comprised in at least one label 23', 23" of the storage container 6 such as to identify the storage container 6.

The reader 22',22" then relays the storage container information via a control and communications system onboard the vehicle 9,9' which transmits the information to the central control system of the automated storage system, illustrated by step 130. Along with the storage container information, the position of the where the storage container 6 is also transmitted to the central control system. For example, if the label 23', 23" has been read by lowering the lifting frame 18, the position is given by the X and Y positions of the storage column 5, and the depth Z that the lifting frame 18 has been lowered to. If the label 23', 23" has been read by lifting the storage container 6 to the vehicle 9,9', then the depth Z where the storage container 6 was lifted from is recorded by the vehicle control system and relayed along with the X and Y position of the storage column 5.

The central control system then identifies the storage container 6 in step 140 by processing the storage container information. Next, the central control system retrieves a record of positional data for storage containers 6 stored in the central control system in step 150. The record of positional data may have been compiled as storage containers are fed into the automated storage system and subsequently moved around by the vehicles 9,9' during operation.

In step 160, the central control system compares the position of the identified storage container 6 with the record of positional data. If the positions correspond, then the method may be terminated or ended for that particular storage container 6, as indicated in step 190. The method is repeated every time a vehicle 9,9' is made to move a storage container 6.

However, if the position of the identified storage container 6 and the record of positional data does not match, the central control system may initiate a search. The identified storage container 6 may then be moved to another storage column 5, shown in step 170, and the identity and position of the storage container 6 is updated in the central control system, shown in step 180. Thereafter, the vehicle 9,9' may move back to the storage column 5 where the misplaced storage container was found, and initiate a digging operation comprising the same steps as shown in FIG. 9 to identify and verify the storage containers 6 in that storage column 5. The vehicle 9,9' may also move to another storage column 5 at any time before, during or after digging through a specific storage column 5 to identify the storage containers 6 therein. The method may thus repeat itself until the central control system has found all misplaced storage containers 6 and the record of positional data is found to match with the actual positions of the storage containers 6.

Figure 10:
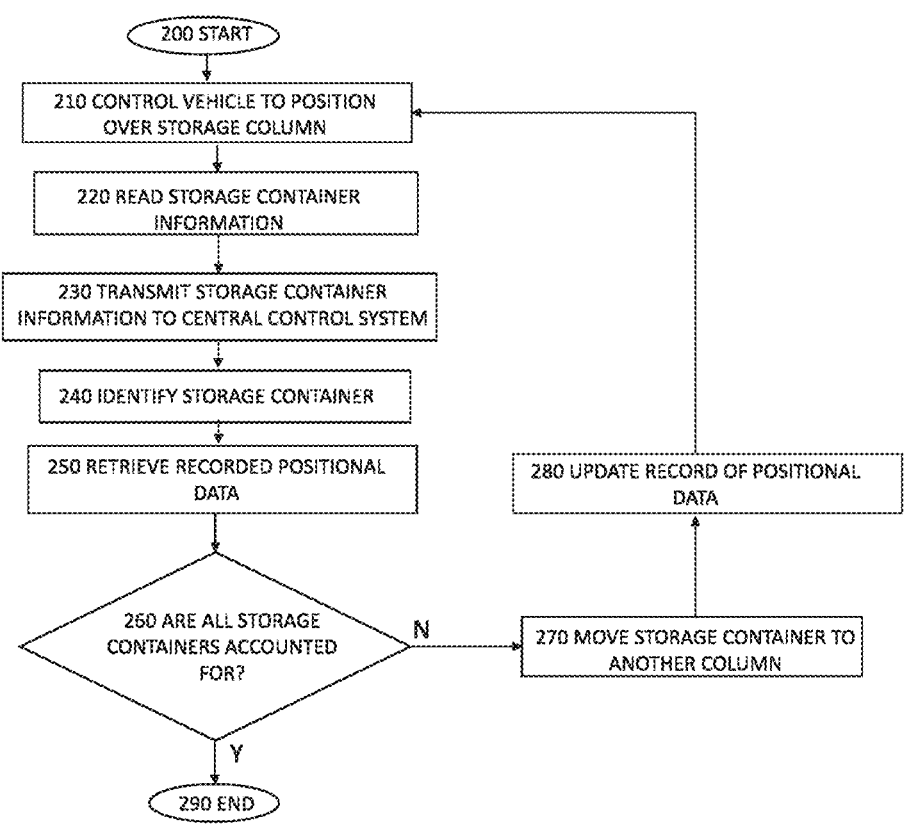
FIG. 10 is schematic flow chart illustrating a method for recovering positional data of storage containers.

FIG. 10 is a schematic flow chart illustrating a method for recovering at least a partial record of positional data for storage containers 6 stored in an automated storage and retrieval system. The method in FIG. 10 may be initiated after a total or partial loss of positional data, indicated in step 200. The loss of data may be the result of a blackout in the central control system, where it is unable to record data or data is lost for a certain period of time. The loss of positional data may thus stretch only a given period back in time. For example, if the registration of storage containers 6 has been unable to record which position the storage containers are to be given for the given period of time, the central control system may have a full record of positional data before that period of time. Given that the system can only perform a certain number of digging operations during the period of time where positional recording failed, it may only be necessary to identify and verify storage containers 6 in storage columns 5 up to a certain depth corresponding to the maximum depth storage containers 6 may have been buried during the blackout.

Thus, the steps 210, 220, 230, 240, 250, 270, 280 and 290 in FIG. 10 are substantially similar as the corresponding steps 110, 120, 130, 140, 150, 170, 180 and 190 in the aspect illustrated in FIG. 9 (i.e. step 210 is similar to step 110, step 220 is similar to step 120 and step 290 is similar to step 190). However, the method in FIG. 10 is initiated with the knowledge that there is a lack of recorded positional data, the vehicle 9,9' may thus be moved to storage columns 5 that are assumed to contain storage containers 6 that are not accounted for in the recorded positional data. Furthermore, the step 260 is determining whether the positional data has been restored based on the loss of data and all storage containers 6 have been accounted for, in contrast to matching up a plurality of misplaced containers 6.

Figure 11:
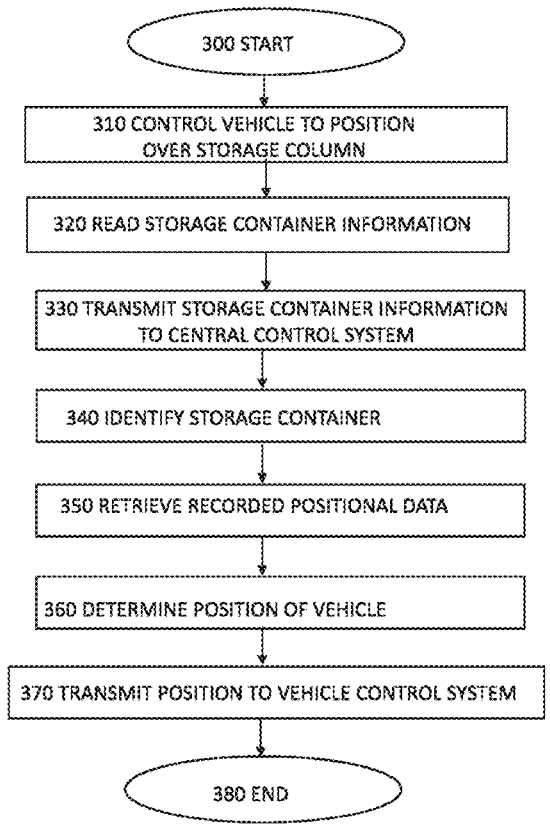
FIG. 11 is a schematic flow chart illustrating a method for verifying the position of a vehicle in a storage system.

FIG. 11 is a schematic flow chart illustrating a method verifying the position of a vehicle 9,9' in an automated storage and retrieval system. In aspects, it may be desirable to verify the position of a vehicle 9,9', assuming the positional data of the recorded storage containers 6 is correct then this may be done by reading a storage container label 23',23". Thus, the method is initiated by a vehicle 9,9' which is assumed to be lost, i.e. the control system on board the vehicle 9,9' is assumed to have lost track of its position, which initiation step is indicated in step 300. The vehicles control system may initiate such a method by itself, or it may be tasked by the central control system to verify its position. Thus, the vehicle 9,9' is moved to a storage column 5 in step 310, the top most storage container 6 is read, step 320, and its information is sent to the central control system, step 330. The central control system identifies the storage container 6 based on the storage container information, step 340, retrieves the recorded positional data of the system in step 350, and by comparing the storage container identity with the recorded location of said storage container 6 the central control system determines the position of the vehicle 9,9' in step 360. The central control system then transmits the determined position of the vehicle 9,9' back to said vehicle 9,9' in step 370, which updates its position and the method is terminated in step 380. The vehicle 9,9' may thus continue on its routine operational tasks with a verified position.

The abovementioned methods are referred to as utilizing one vehicle 9,9', however, a plurality of vehicles 9,9' may also be used to simultaneously perform any of the steps in these methods. Typically, for a situation where positional data has been lost, all vehicles 9,9' in a system may perform data recovery tasks until the central control system has recovered the positional data.

The invention may advantageously provide redundancy in the system, e.g. to rapidly verify or determine that the correct storage container is picked.

Furthermore, the invention may advantageously provide a system and method for recovering position data of one or more storage containers in the event of a total or partial loss of position data in the central control system.

Advantageously, the invention may further provide a system and a method where the position of vehicles may be verified or determined.

In the preceding description, various aspects of an automated storage and retrieval system, vehicle and methods according to the invention have been described with reference to the illustrative embodiment. However, this description is not intended to be construed in a limiting sense. Various modifications and variations of the illustrative embodiments, as well as other embodiments of the system, which are apparent to persons skilled in the art, are deemed to lie within the scope of the present invention as defined by the following claims.

REFERENCE NUMERALS

P1 First horizontal plane
P2 Second horizontal plane

1 Framework structure
2 Upright member
3 Horizontal member
4 Storage grid
5 Storage column
6 Storage container
7 Stack
8 Rail system
9 Container handling vehicle
9' Traverse travelling vehicle
10 First set of rails
11 Second set of rails
12 Grid column
13 Vehicle body
14 First set of wheels (transport mechanism)
15 Second set of wheels (transport mechanism)
16 Lifting device (elevator)
17 Guiding pin
18 Lifting frame
19 First port column
20 Second port column
21 camera
22', 22" reader
23', 23" label
24' First support structure
24" Second support structure
25 Footprint
30 Motor
31 Lifting plate
31a Top cover
31b Base cover
38 gripper
39 Guiding device
40 Brake arrangement
41 Support structure
42 Beam
43 Rope chain X direction
44 Rope, chain Y direction
45 Winch
46 Lifting bands

What is claimed is:

1. A vehicle for use in an automated storage and retrieval system, the vehicle comprising:
   a transport mechanism for transporting the vehicle along a first guiding system in a first direction and a second guiding system in a second direction, where the second direction is orthogonal to the first direction, and
   a lifting device for lifting storage containers from storage columns arranged below the vehicle,
   wherein the lifting device comprises a lifting frame connectable to a storage container,
   wherein the vehicle further comprises at least one reader for reading at least one label of a storage container such as to identify the storage container, and
   wherein the at least one reader is arranged on the lifting frame of the vehicle.

2. The vehicle according to claim 1, wherein the at least one label is positioned inside the storage container.

3. The vehicle according to claim 1, wherein at least one additional reader is arranged inside a cavity, inside a body of the vehicle or on a wall of a storage space arranged on a side of a body of the vehicle.

4. The vehicle according to claim 1, wherein the at least one reader is in communication with a central control system, and wherein the at least one reader is able to transmit data representing a storage container to the central control system and to receive data representing a storage container from the central control system.

5. The vehicle according to claim 1, wherein the at least one reader is a RFID reader and the at least one label is a RFID label.

6. An automated storage and retrieval system comprising:
   a guiding assembly comprising:
      a first guiding system arranged in a first horizontal plane and extending in a first direction, and
      a second guiding system arranged in a second horizontal plane and extending in a second direction which is orthogonal to the first direction,
   wherein the guiding assembly is configured to be disposed generally above a plurality of stacks of storage containers arranged in a grid pattern, the grid pattern extending in the first direction and the second direction, and
   at least one vehicle comprising:
      a transport mechanism for transporting the at least one vehicle along a first guiding system in a first direction and a second guiding system in a second direction, and
      a lifting device for lifting storage containers from storage columns arranged below the at least one vehicle,
   wherein the lifting device comprises a lifting frame connectable to a storage container,
   wherein the at least one vehicle further comprises at least one reader for reading at least one label of a storage container such as to identify the storage container, and
   wherein the at least one reader is arranged on the lifting frame of the at least one vehicle.

7. The system of claim 6, wherein the at least one label is positioned inside the storage container.

8. The system of claim 6, wherein the guiding assembly comprises a rail system comprising a first set of parallel tracks arranged in the first horizontal plane and extending in the first direction, and a second set of parallel tracks arranged in the second horizontal plane and extending in the second direction.

9. The system of claim 8, wherein the first horizontal plane and the second horizontal plane are the same horizontal plane.

10. The system of claim 6, further comprising the plurality of stacks of storage containers arranged in a grid pattern.

11. The system of claim 10, wherein each storage container comprises at least two labels.

12. The system of claim 10, wherein each storage container comprises one label, and wherein the one label is arranged at the same position in each of the storage containers.

13. A method of identifying at least one storage container in an automated storage and retrieval system, comprising:
   controlling a vehicle to a position above a storage column in which a target storage container is positioned, the vehicle comprising a lifting device for lifting storage containers from storage columns below the vehicle, the lifting device comprising a lifting frame connectable to a storage container;
   lowering the lifting frame to the position of the target storage container; and
   utilizing at least one reader positioned on the lifting frame to read storage container information comprised in at least one label of the target storage container such as to identify the target storage container.

14. The method of claim 13, further comprising:
   utilizing at least one additional reader positioned in a storage space encompassing the automated storage and retrieval system to read the storage container information comprised in at least one label of the target storage container such as to identify the target storage container.

15. The method of claim 13, further comprising:
transmitting the storage container information to a central control system,
identifying the target storage container by processing the storage container information in the central control system,
retrieving a record of positional data for storage containers stored in the central control system,
determining the position of the vehicle by comparing an identity of the target storage container with a recorded position of said target storage container, and
transmitting the determined position of the vehicle to a control and communications system onboard said vehicle.

16. The method of claim 13, further comprising:
transmitting the storage container information to a central control system,
identifying the target storage container by processing the storage container information in the central control system,
moving the target storage container to another storage column, and
updating a record of positional data for storage containers stored in the central control system.

17. The method of claim 16, further comprising:
repeating the steps in the method until the position of all storage containers are accounted for in the record of positional data for storage containers stored in the central control system.

18. The method of claim 13, further comprising:
transmitting the storage container information and a position of said target storage container to a central control system,
identifying the target storage container by processing the storage container information in the central control system,
retrieving a record of positional data for storage containers stored in the central control system, and
comparing the position of the identified target storage container with a recorded position of said target storage container.

19. The method of claim 18, wherein the step of comparing the position of the identified target storage container with a recorded position of said target storage container determines that the record of positional data for storage containers stored in the central control system is incorrect, the method further comprises:
moving the target storage container to another storage column, and
updating the record of positional data for storage containers stored in the central control system.

20. The method of claim 19, further comprising:
repeating the steps in the method until the position of all identified storage containers match with a recorded position of said storage containers in the record of positional data for storage containers stored in the central control system.

* * * * *